(12) United States Patent
Nolan et al.

(10) Patent No.: US 8,458,105 B2
(45) Date of Patent: Jun. 4, 2013

(54) METHOD AND APPARATUS FOR ANALYZING AND INTERRELATING DATA

(75) Inventors: James J. Nolan, Springfield, VA (US); Mark E. Frymire, Arlington, VA (US); Andrew F. David, Ft. Belvoir, VA (US)

(73) Assignee: Decisive Analytics Corporation, Arlington, VA (US)

( * ) Notice: Subject to any disclaimer, the term of this patent is extended or adjusted under 35 U.S.C. 154(b) by 771 days.

(21) Appl. No.: 12/548,888

(22) Filed: Aug. 27, 2009

(65) Prior Publication Data

US 2010/0205128 A1    Aug. 12, 2010

Related U.S. Application Data

(60) Provisional application No. 61/152,085, filed on Feb. 12, 2009.

(51) Int. Cl.
*G06N 3/12* (2006.01)

(52) U.S. Cl.
USPC .......................................................... 706/13

(58) Field of Classification Search
USPC ........................ 706/46, 19, 16, 13; 717/110
See application file for complete search history.

(56) References Cited

U.S. PATENT DOCUMENTS

| | | | |
|---|---|---|---|
| 4,423,884 A | 1/1984 | Gevers | |
| 4,488,174 A | 12/1984 | Mitchell et al. | |
| 4,887,212 A | 12/1989 | Zamora et al. | |
| 5,056,021 A | 10/1991 | Ausborn | |
| 5,215,426 A | 6/1993 | Bills, Jr. | |
| 5,327,254 A | 7/1994 | Daher | |
| 5,689,716 A | 11/1997 | Chen | |
| 5,694,523 A | 12/1997 | Wical | |
| 5,708,822 A | 1/1998 | Wical | |
| 5,798,786 A | 8/1998 | Lareau et al. | |
| 5,841,895 A | 11/1998 | Huffman | |
| 5,884,305 A | 3/1999 | Kleinberg et al. | |
| 5,903,307 A | 5/1999 | Hwang | |
| 5,930,788 A | 7/1999 | Wical | |
| 5,953,718 A | 9/1999 | Wical | |
| 6,009,587 A | 1/2000 | Beeman | |
| 6,052,657 A | 4/2000 | Yamron et al. | |
| 6,064,952 A | 5/2000 | Imanaka et al. | |
| 6,073,138 A | 6/2000 | de l'Etraz et al. | |
| 6,085,186 A | 7/2000 | Christianson et al. | |
| 6,173,279 B1 | 1/2001 | Levin et al. | |
| 6,181,711 B1 | 1/2001 | Zhang et al. | |
| 6,185,531 B1 | 2/2001 | Schwartz et al. | |
| 6,199,034 B1 | 3/2001 | Wical | |

(Continued)

OTHER PUBLICATIONS

Nolan, Jim, "Attacking the Network," unknown publication, Nov. 2007.

(Continued)

*Primary Examiner* — Jeffrey A Gaffin
*Assistant Examiner* — Ola Olude Afolabi
(74) *Attorney, Agent, or Firm* — Daniel A. Thomson; Emerson Thomson Bennett, LLC (57) ABSTRACT

A method for automatically organizing data into themes, the method including the steps of retrieving electronic data from at least one data source, storing the data in a temporary storage medium, querying the data in the storage medium using a computer-based query language, identifying themes within the data stored in the storage medium using a computer program including an algorithm, and organizing the data stored in the storage medium into the identified themes.

17 Claims, 8 Drawing Sheets

U.S. PATENT DOCUMENTS

| | | |
|---|---|---|
| 6,327,586 B1 | 12/2001 | Kisiel |
| 6,394,734 B1 | 5/2002 | Landoll et al. |
| 6,487,545 B1 | 11/2002 | Wical |
| 6,505,151 B1 | 1/2003 | Chou et al. |
| 6,533,822 B2 | 3/2003 | Kupiec |
| 6,665,656 B1 | 12/2003 | Carter |
| 6,675,159 B1 | 1/2004 | Lin et al. |
| 6,714,909 B1 | 3/2004 | Gibbon et al. |
| 6,757,008 B1 | 6/2004 | Smith |
| 6,772,120 B1 | 8/2004 | Moreno et al. |
| 6,775,677 B1 | 8/2004 | Ando et al. |
| 6,798,447 B1 | 9/2004 | Katsuki |
| 6,803,946 B1 | 10/2004 | Wakiyama et al. |
| 6,822,855 B2 | 11/2004 | Pressley, Jr. et al. |
| 6,860,702 B1 | 3/2005 | Banks |
| 6,892,189 B2 | 5/2005 | Quass et al. |
| 6,901,392 B1 | 5/2005 | Kindo |
| 6,940,908 B1 | 9/2005 | Smith |
| 6,961,954 B1 | 11/2005 | Maybury et al. |
| 6,970,881 B1 | 11/2005 | Mohan et al. |
| 6,978,274 B1 | 12/2005 | Gallivan et al. |
| 6,986,633 B2 | 1/2006 | Kellogg et al. |
| 7,006,568 B1 | 2/2006 | Gu et al. |
| 7,033,127 B2 | 4/2006 | Ungetheim et al. |
| 7,051,022 B1 | 5/2006 | Faisal |
| 7,069,256 B1 | 6/2006 | Campos |
| 7,092,927 B2 | 8/2006 | Clark et al. |
| 7,110,459 B2 | 9/2006 | Srinivasan |
| 7,114,174 B1 | 9/2006 | Brooks et al. |
| 7,143,432 B1 | 11/2006 | Brooks et al. |
| 7,155,668 B2 | 12/2006 | Holland et al. |
| 7,158,983 B2 | 1/2007 | Willse et al. |
| 7,184,959 B2 | 2/2007 | Gibbon et al. |
| 7,191,175 B2 | 3/2007 | Evans |
| 7,194,483 B1 | 3/2007 | Mohan et al. |
| 7,197,451 B1 | 3/2007 | Carter et al. |
| 7,218,022 B2 | 5/2007 | Pfister et al. |
| 7,225,183 B2 | 5/2007 | Gardner |
| 7,226,537 B2 | 6/2007 | Broyer et al. |
| 7,248,286 B2 | 7/2007 | Cho |
| 7,251,637 B1 | 7/2007 | Caid et al. |
| 7,258,384 B2 | 8/2007 | Drabik et al. |
| 7,266,537 B2 | 9/2007 | Jacobsen et al. |
| 7,271,804 B2 | 9/2007 | Evans |
| 7,283,589 B2 | 10/2007 | Cai et al. |
| 7,290,207 B2 | 10/2007 | Colbath et al. |
| 7,292,602 B1 | 11/2007 | Liu et al. |
| 7,292,634 B2 | 11/2007 | Yamamoto et al. |
| 7,292,636 B2 | 11/2007 | Haskell et al. |
| 7,295,831 B2 | 11/2007 | Coleman et al. |
| 7,299,191 B2 | 11/2007 | Hamada |
| 7,299,289 B1 | 11/2007 | Lorenz et al. |
| 7,301,999 B2 | 11/2007 | Filippini et al. |
| 7,302,003 B2 | 11/2007 | Battistella |
| 7,302,481 B1 | 11/2007 | Wilson |
| 7,304,590 B2 | 12/2007 | Park |
| 7,307,553 B2 | 12/2007 | Woo et al. |
| 7,310,110 B2 | 12/2007 | Grindstaff et al. |
| 7,310,371 B2 | 12/2007 | Cote et al. |
| 7,313,279 B2 | 12/2007 | Duan et al. |
| 7,313,556 B2 | 12/2007 | Gallivan et al. |
| 7,319,999 B2 | 1/2008 | Evans |
| 7,324,871 B2 | 1/2008 | Loscalzo et al. |
| 7,328,209 B2 | 2/2008 | Das et al. |
| 7,340,466 B2 | 3/2008 | Odom et al. |
| 7,376,893 B2 | 5/2008 | Chen et al. |
| 7,389,225 B1 | 6/2008 | Jensen et al. |
| 7,389,282 B2 | 6/2008 | Maren |
| 7,401,057 B2 | 7/2008 | Eder |
| 7,406,453 B2 | 7/2008 | Mundie et al. |
| 7,424,427 B2 | 9/2008 | Liu et al. |
| 7,440,622 B2 | 10/2008 | Evans |
| 7,447,665 B2 | 11/2008 | Murray |
| 7,475,008 B2 | 1/2009 | Jensen et al. |
| 2002/0065856 A1 | 5/2002 | Kisiel |
| 2003/0200192 A1 | 10/2003 | Bell et al. |
| 2004/0086268 A1 | 5/2004 | Radha et al. |
| 2004/0161034 A1 | 8/2004 | Morozov et al. |
| 2005/0022106 A1 | 1/2005 | Kawai et al. |
| 2005/0102135 A1 | 5/2005 | Goronzy et al. |
| 2005/0268279 A1* | 12/2005 | Paulsen et al. ............... 717/110 |
| 2006/0017814 A1 | 1/2006 | Pinto et al. |
| 2006/0085434 A1 | 4/2006 | Mah et al. |
| 2006/0184483 A1 | 8/2006 | Clark et al. |
| 2006/0235811 A1 | 10/2006 | Fairweather |
| 2007/0011108 A1 | 1/2007 | Benson et al. |
| 2007/0016540 A1 | 1/2007 | Sun et al. |
| 2007/0112714 A1 | 5/2007 | Fairweather |
| 2007/0276775 A1 | 11/2007 | Gloor |
| 2008/0154821 A1 | 6/2008 | Poulin |
| 2008/0208901 A1 | 8/2008 | Friedlander et al. |
| 2008/0208904 A1 | 8/2008 | Friedlander et al. |
| 2008/0288425 A1 | 11/2008 | Posse et al. |
| 2008/0288430 A1 | 11/2008 | Friedlander et al. |
| 2009/0024553 A1 | 1/2009 | Angell et al. |
| 2009/0083207 A1 | 3/2009 | Aparicio, IV |
| 2009/0276377 A1 | 11/2009 | Dutta et al. |

OTHER PUBLICATIONS

Decisive Analytics Corporation, "Attacking the Network: Five Steps to Finding and Stopping the True Terrorist Threat," Decisive Analytics Corporation White Paper, 2008.

BBN Technologies, "BBN Broadcast Monitoring System," unknown publication, 2009, www.bbn.com.

Decisive Analytics Corporation, "Discovering the Activities of Your Enemies in the News Media," unknown publication, 2008.

Boswell, Wendy, "Learn More About Podzinger, a Search Engine That Searches for the Spoken Word," unknown publication, unknown date, www.about.com.

Lei, Gunnewiek, With, "Reuse of Motion Processing for Camera Stabilization and Coding," 2006 IEEE International Conference on Multimedia and Expo: 597-600, 2006.

Mohsenian, Rajagopalan, Gonzales, "Single-Pass Constant- and Variable-Bit-Rate MPEG-2 Video Compression," IBM Journal of Research and Development vol. 43, Issue 4, pp. 489-509, Jul. 1999.

Khayam, Syed Ali, "The Discrete Cosine Transform (DCT): Theory and Application," unknown publication, Mar. 10, 2003.

Iaks Nagel Institut Fur Algorithmen Und Kognitive Systeme, "VidText," unknown publication, Feb. 17, 2005, www.cogviys.iaks.uni-karlsruhe.de.

SRI International, "Video Text Recognition," unknown publication, 2008, www.sri.com.

D. D. Palmer, P. Bray, M. Reichman, K. Rhodes, N. White, A. Merlino, F. Kubala, "Multilingual Video and Audio News Alerting," referenced by Examiner in Office Action for U.S. Appl. No. 12/648,978.

\* cited by examiner

METHOD AND APPARATUS FOR ANALYZING AND INTERRELATING DATA

I. BACKGROUND

A. Field of Invention

This application claims priority to U.S. Ser. No. 61/152,085, filed Feb. 12, 2009, which is incorporated herein by reference. This invention pertains to the art of methods and apparatuses regarding analyzing data sources and more specifically to apparatuses and methods regarding organization of data into themes.

B. Description of the Related Art

Government intelligence agencies use a variety of techniques to obtain information, ranging from secret agents (HUMINT—Human Intelligence) to electronic intercepts (COMINT—Communications Intelligence, IMINT—Imagery Intelligence, SIGINT—Signals Intelligence, and ELINT—Electronics Intelligence) to specialized technical methods (MASINT—Measurement and Signature Intelligence).

The process of taking known information about situations and entities of strategic, operational, or tactical importance, characterizing the known, and, with appropriate statements of probability, the future actions in those situations and by those entities is called intelligence analysis. The descriptions are drawn from what may only be available in the form of deliberately deceptive information; the analyst must correlate the similarities among deceptions and extract a common truth. Although its practice is found in its purest form inside intelligence agencies, its methods are also applicable in fields such as business intelligence or competitive intelligence.

Intelligence analysis is a way of reducing the ambiguity of highly ambiguous situations, with the ambiguity often very deliberately created by highly intelligent people with mindsets very different from the analyst's. Many analysts frequently reject high or low probability explanations, due to the difficulty in obtaining evidence to support those explanations. Analysts may use their own standard of proportionality as to the risk acceptance of the opponent, rejecting that the opponent may take an extreme risk to achieve what the analyst regards as a minor gain. Above all, the analyst must avoid the special cognitive traps for intelligence analysis projecting what she or he wants the opponent to think, and using available information to justify that conclusion.

Since the end of the Cold War, the intelligence community has contended with the emergence of new threats to national security from a number of quarters, including increasingly powerful non-state actors such as transnational terrorist groups. Many of these actors have capitalized on the still evolving effects of globalization to threaten U.S. security in nontraditional ways. At the same time, global trends such as the population explosion, uneven economic growth, urbanization, the AIDS pandemic, developments in biotechnology, and ecological trends such as the increasing scarcity of fresh water in several already volatile areas are generating new drivers of international instability. These trends make it extremely challenging to develop a clear set of priorities for collection and analysis.

Intelligence analysts are tasked with making sense of these developments, identifying potential threats to U.S. national security, and crafting appropriate intelligence products for policy and decision makers. They also will continue to perform traditional missions such as uncovering secrets that potential adversaries desire to withhold and assessing foreign military capabilities. This means that, besides using traditional sources of classified information, often from sensitive sources, they must also extract potentially critical knowledge from vast quantities of available open source information.

For example, the process of globalization, empowered by the Information Revolution, will require a change of scale in the intelligence community's (IC) analytical focus. In the past, the IC focused on a small number of discrete issues that possessed the potential to cause severe destruction of known forms. The future will involve security threats of much smaller scale. These will be less isolated, less the actions of military forces, and more diverse in type and more widely dispersed throughout global society than in the past. Their aggregate effects might produce extremely destabilizing and destructive results, but these outcomes will not be obvious based on each event alone. Therefore, analysts increasingly must look to discern the emergent behavioral aspects of a series of events.

Second, phenomena of global scope will increase as a result of aggregate human activities. Accordingly, analysts will need to understand global dynamics as never before. Information is going to be critical, as well as analytical understanding of the new information, in order to understand these new dynamics. The business of organizing and collecting information is going to have to be much more distributed than in the past, both among various US agencies as well as international communities. Information and knowledge sharing will be essential to successful analysis.

Third, future analysts will need to focus on anticipation and prevention of security threats and less on reaction after they have arisen. For example, one feature of the medical community is that it is highly reactive. However, anyone who deals with infectious diseases knows that prevention is the more important reality. Preventing infectious diseases must become the primary focus if pandemics are to be prevented. Future analysts will need to incorporate this same emphasis on prevention to the analytic enterprise. It appears evident that in this emerging security environment the traditional methods of the intelligence community will be increasingly inadequate and increasingly in conflict with those methods that do offer meaningful protection. Remote observation, electromagnetic intercept and illegal penetration were sufficient to establish the order of battle for traditional forms of warfare and to assure a reasonable standard that any attempt to undertake a massive surprise attack would be detected. There is no serious prospect that the problems of civil conflict and embedded terrorism, of global ecology and of biotechnology can be adequately addressed by the same methods. To be effective in the future, the IC needs to remain a hierarchical structure in order to perform many necessary functions, but it must be able to generate collaborative networks for various lengths of time to provide intelligence on issues demanding interdisciplinary analysis.

The increased use of electronic communication, such as cell phones and e-mail, by terrorist organizations has led to increased, long-distance communication between terrorists, but also allows the IC to intercept transmissions. A system needs to be implemented that will allow automated analysis of the increasingly large amount of electronic data being retrieved by the IC.

Query languages are computer languages used to make queries into databases and information systems. A programming language is a machine-readable artificial language designed to express computations that can be performed by a machine, particularly a computer. Programming languages can be used to create programs that specify the behavior of a machine, to express algorithms precisely, or as a mode of human communication.

Broadly, query languages can be classified according to whether they are database query languages or information retrieval query languages. Examples include: .QL is a proprietary object-oriented query language for querying relational databases; Common Query Language (CQL) a formal language for representing queries to information retrieval systems such as as web indexes or bibliographic catalogues; CODASYL; CxQL is the Query Language used for writing and customizing queries on CxAudit by Checkmarx; D is a query language for truly relational database management systems (TRDBMS); DMX is a query language for Data Mining models; Datalog is a query language for deductive databases; ERROL is a query language over the Entity-relationship model (ERM) which mimics major Natural language constructs (of the English language and possibly other languages). It is especially tailored for relational databases; Gellish English is a language that can be used for queries in Gellish English Databases, for dialogues (requests and responses) as well as for information modeling and knowledge modeling; ISBL is a query language for PRTV, one of the earliest relational database management systems; LDAP is an application protocol for querying and modifying directory services running over TCP/IP; MQL is a cheminformatics query language for a substructure search allowing beside nominal properties also numerical properties; MDX is a query language for OLAP databases; OQL is Object Query Language; OCL (Object Constraint Language). Despite its name, OCL is also an object query language and a OMG standard; OPath, intended for use in querying WinFS Stores; Poliqarp Query Language is a special query language designed to analyze annotated text. Used in the Poliqarp search engine; QUEL is a relational database access language, similar in most ways to SQL; SMARTS is the cheminformatics standard for a substructure search; SPARQL is a query language for RDF graphs; SQL is a well known query language for relational databases; SuprTool is a proprietary query language for SuprTool, a database access program used for accessing data in Image/SQL (TurboIMAGE) and Oracle databases; TMQL Topic Map Query Language is a query language for Topic Maps; XQuery is a query language for XML data sources; XPath is a language for navigating XML documents; XSQL combines the power of XML and SQL to provide a language and database independent means to store and retrieve SQL queries and their results.

The most common operation in SQL databases is the query, which is performed with the declarative SELECT keyword. SELECT retrieves data from a specified table, or multiple related tables, in a database. While often grouped with Data Manipulation Language (DML) statements, the standard SELECT query is considered separate from SQL DML, as it has no persistent effects on the data stored in a database. Note that there are some platform-specific variations of SELECT that can persist their effects in a database, such as the SELECT INTO syntax that exists in some databases.

SQL queries allow the user to specify a description of the desired result set, but it is left to the devices of the database management system (DBMS) to plan, optimize, and perform the physical operations necessary to produce that result set in as efficient a manner as possible. An SQL query includes a list of columns to be included in the final result immediately following the SELECT keyword. An asterisk ("*") can also be used as a "wildcard" indicator to specify that all available columns of a table (or multiple tables) are to be returned. SELECT is the most complex statement in SQL, with several optional keywords and clauses, including: The FROM clause which indicates the source table or tables from which the data is to be retrieved. The FROM clause can include optional JOIN clauses to join related tables to one another based on user-specified criteria; the WHERE clause includes a comparison predicate, which is used to restrict the number of rows returned by the query. The WHERE clause is applied before the GROUP BY clause. The WHERE clause eliminates all rows from the result set where the comparison predicate does not evaluate to True; the GROUP BY clause is used to combine, or group, rows with related values into elements of a smaller set of rows. GROUP BY is often used in conjunction with SQL aggregate functions or to eliminate duplicate rows from a result set; the HAVING clause includes a comparison predicate used to eliminate rows after the GROUP BY clause is applied to the result set. Because it acts on the results of the GROUP BY clause, aggregate functions can be used in the HAVING clause predicate; and the ORDER BY clause is used to identify which columns are used to sort the resulting data, and in which order they should be sorted (options are ascending or descending). The order of rows returned by an SQL query is never guaranteed unless an ORDER BY clause is specified.

II. SUMMARY

According to one embodiment of this invention, a method for automatically organizing data into themes includes the steps of retrieving electronic data from at least one data source, correcting typographical errors in the data, storing the data in a temporary storage medium, querying the data in the storage medium using a computer-based query language, identifying themes within the data stored in the storage medium using a computer program including an algorithm, characterizing the themes based on the level of threat each theme represents, organizing the data stored in the storage medium into the identified themes based on the content of the data, determining the amount a discrete set of data contributed to a specific theme, identifying themes that are emerging, increasing, or declining, tracking themes over a time period, identifying a plurality of entities that are collaborating on the same theme, determining the roles and relationships between the plurality of entities, including the affinity between the plurality of entities, identifying and predicting the probability of a future event, analyzing the queried data and posting the analysis on a computer database.

According to another embodiment of this invention, a computer-based system includes electronic data from a plurality of data sources, a temporary storage medium for storing the electronic data, a computer-based query language tool for querying the data in the storage medium, a computer program including an algorithm for: (1) identifying themes within the data stored in the storage medium, (2) identifying a plurality of entities that are collaborating on the same theme, (3) determining the roles and relationships between the plurality of entities, and (4) identifying and predicting the probability of a future event. The algorithm may be a statistical probability based algorithm.

One advantage of this invention is that it enables military and intelligence analysts to quickly identify and discover events in classified and open source data to support the overall analytical process.

Another advantage of this invention is that it enables military and intelligence analysts to predict future terrorist events.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

IV. DEFINITIONS

The following terms may be used throughout the descriptions presented herein and should generally be given the following meaning unless contradicted or elaborated upon by other descriptions set forth herein.

Affinity—the strength of the relationship between two entities that are identified in the data.

Co-occurrence—two entities being mentioned in the same document, e-mail, report, or other medium.

Evaluate—evaluate the quality of the formed networks. Terror networks are highly dynamic and fluid, and key actors may bridge across several groups.

Hidden Relationship—a concealed connection or association.

Identify—identify candidate terror networks. Parse incoming intelligence data to identify possible entities (people, places, locations, events) and their relationships.

Programming language—a machine-readable artificial language designed to express computations that can be performed by a machine, particularly a computer. Programming languages can be used to create programs that specify the behavior of a machine, to express algorithms precisely, or as a mode of human communication.

Query language—computer languages used to make queries into databases and information systems.

Temporary storage medium—Random access memory (RAM) and/or temporary files stored on a physical medium, such as a hard drive.

Test—test the observed activities to determine if they are suspicious. Uncertainty must be incorporated to maximize the chance of identifying terrorist behaviors.

V. DETAILED DESCRIPTION

To start the analysis, an analyst runs the intelligence data through the system to identify themes, networks, and locations of activities. At this stage, the system has analyzed each report, identified the number of themes present, and placed each report into one or more themes based on their content. Themes are automatically created based on no prior user input. Additionally, intelligence reports can be categorized across multiple themes (they are not restricted to just one). This is particularly important with intelligence data that can cross multiple subjects of discussion.

The system can determine how much a given report contributed to a theme, by reading the one or two reports most strongly associated with each theme. By doing this, the system can analyze why the words were categorized in the original theme visualization, and the user can easily assign readable titles to each theme for easy recall. This takes much less time than would have been required to obtain a similar breadth of understanding by reading all of the reports.

In one example, through the process of coming to understand the themes covered in the text, the system is able to generate focused queries using the application. For example, one theme focused on a school, so the user can run a more focused query ("school") that returned six relevant reports. By skimming these, the user learns that maps found in the home of a suspected insurgent, Al-Obeidi, had red circles around likely targets for an attack. One was a hospital in Yarmuk, while the other was a primary school in Bayaa. The user asked other questions like these and was able to quickly draw useful conclusions about the content of the data.

At this point, the system has presented a coherent understanding of the themes that are present in the intelligence data, the key events that have been identified, and some of the key characters. However, at this point in the example, a clear picture has not developed of how all of these characters and events were related. To get that picture, the user uses the Networks capability. The Network relies on the output of themes to generate an affinity view. In this context, an entity could be a person, place, or organization. The affinity driven metric captures all of the complexity associated in such social relationships and, if not managed correctly, can be difficult to interpret (sometimes referred to as the "hairball problem").

Through this analytical process the user concluded that two suspected insurgents, Al-Obeidi and Mashhadan, were close to executing a liquid explosives attack which was probably directed at the primary school in Bayaa, although there was some chance that the hospital in Yarmuk was the target. Furthermore, he determined that an ambulance would be the most likely means to deliver the explosives. The user was also able to provide details on other key people that were involved in planning, training for, and executing the attack. The time required to reach this conclusion, as measured from connecting to the set of intelligence data to final analytical product delivered, was one hour and eleven minutes; far less than the several hours required to read all of these reports individually and draw connections among the disjoint themes.

Attacking the Network represents the next stage in our fight against the threat of Improvised Explosive Devices (IEDs) and terrorism in general. In this mode, we move away from trying to mitigate the effects of the attack, instead eliminating them altogether by defeating the core components of the terrorism operation: the key actors and their networks. By moving away from the attack itself and "up the kill chain" we can effectively neutralize the entire operation of a terrorist cell. This has many obvious advantages in the Global War on Terror.

From an intelligence perspective, "Attacking the Network" really means being able to identify the key actors in the terror network, their relationships, and understanding their intent. In a technical sense, it requires the ability to: extract and correlate seemingly unrelated pieces of data, distinguish that data from the white noise of harmless civilian activity, and find the hidden relationships that characterize the true threat.

The situation becomes very complicated when we consider the sheer amount of data that must be analyzed: intercepted telephone conversations, sensor readings, and human intelligence. Each of these sources needs to be analyzed in its own unique way and then fused into a cohesive picture to enable rapid and effective decision-making.

The system can break these capabilities down into focus areas and then identify the enabling technologies which can be applied to achieve the goals of the Attacking the Network. These three focus areas are: Identify, Test, and Evaluate.

Identify—identify candidate terror networks. Parse incoming intelligence data to identify possible entities (people, places, locations, events) and their relationships. Test—test the observed activities to determine if they are suspicious. Uncertainty must be incorporated to maximize the chance of identifying terrorist behaviors. Evaluate—evaluate the quality of the formed networks. Terror networks are highly dynamic and fluid, and key actors may bridge across several groups.

Table 1 represents a summary of these enabling capabilities and describes them in terms of the feature they provide and the benefit provided to the intelligence analyst.

TABLE 1

| Capability | Feature Provided | Intelligence Analyst Benefit |
| --- | --- | --- |
| Entity Extraction | identifies entities in structured and unstructured intel data. | rapid identification of key actors, places, organizations. |
| Social Networking | characterizes the relationships between entities in the terror networks. | understanding of possible relationships between actors, places, organizations. |
| Theme Generation | organizes intelligence data into relevant themes. | enables analyst to focus their attention on the most relevant information. |
| Computational Probability | characterizes the uncertainty of the associations in the developed terror networks. | quantifies the strength of the relationships between actors, places, organizations. |
| Language Translation | provides understanding of events from multiple sources. | analyst can quickly move across multi-language data sources. |
| Visualization | presentation of analytical information. | Presents the information in such a way that an analyst can make accurate decisions quickly. |

Figure 1:
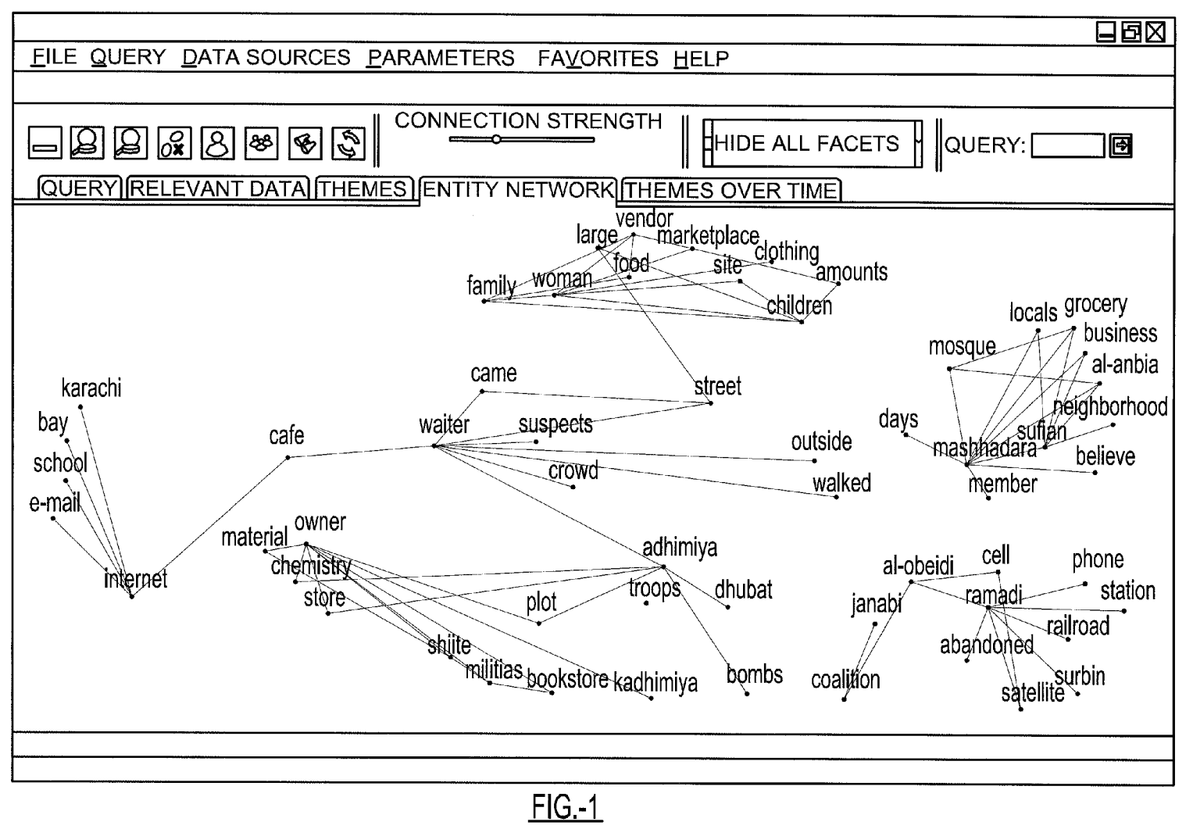
FIG. 1 shows a chart representing relationships between entities.
Figure 2:
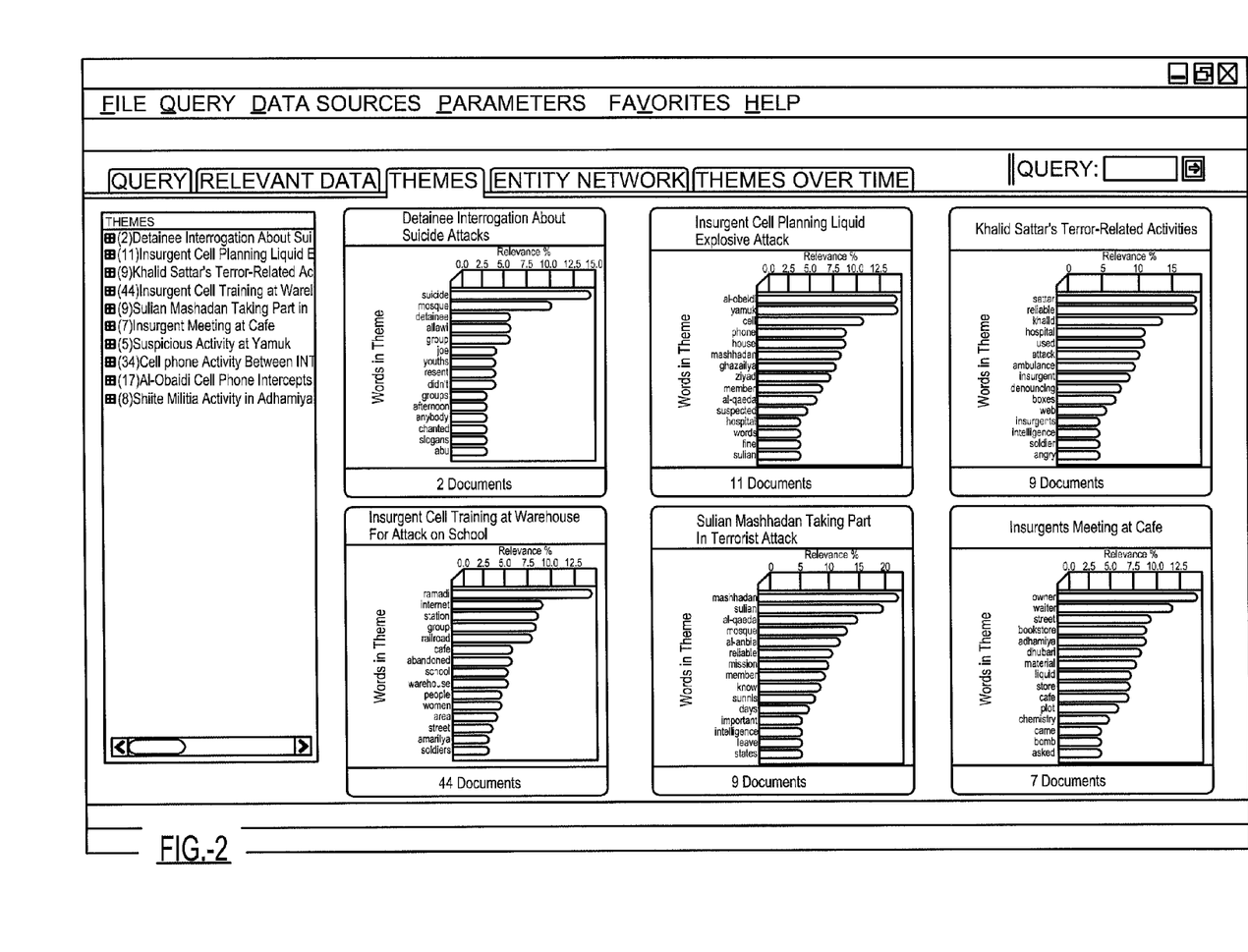
FIG. 2 shows a screen shot of representative themes.
Figure 3:
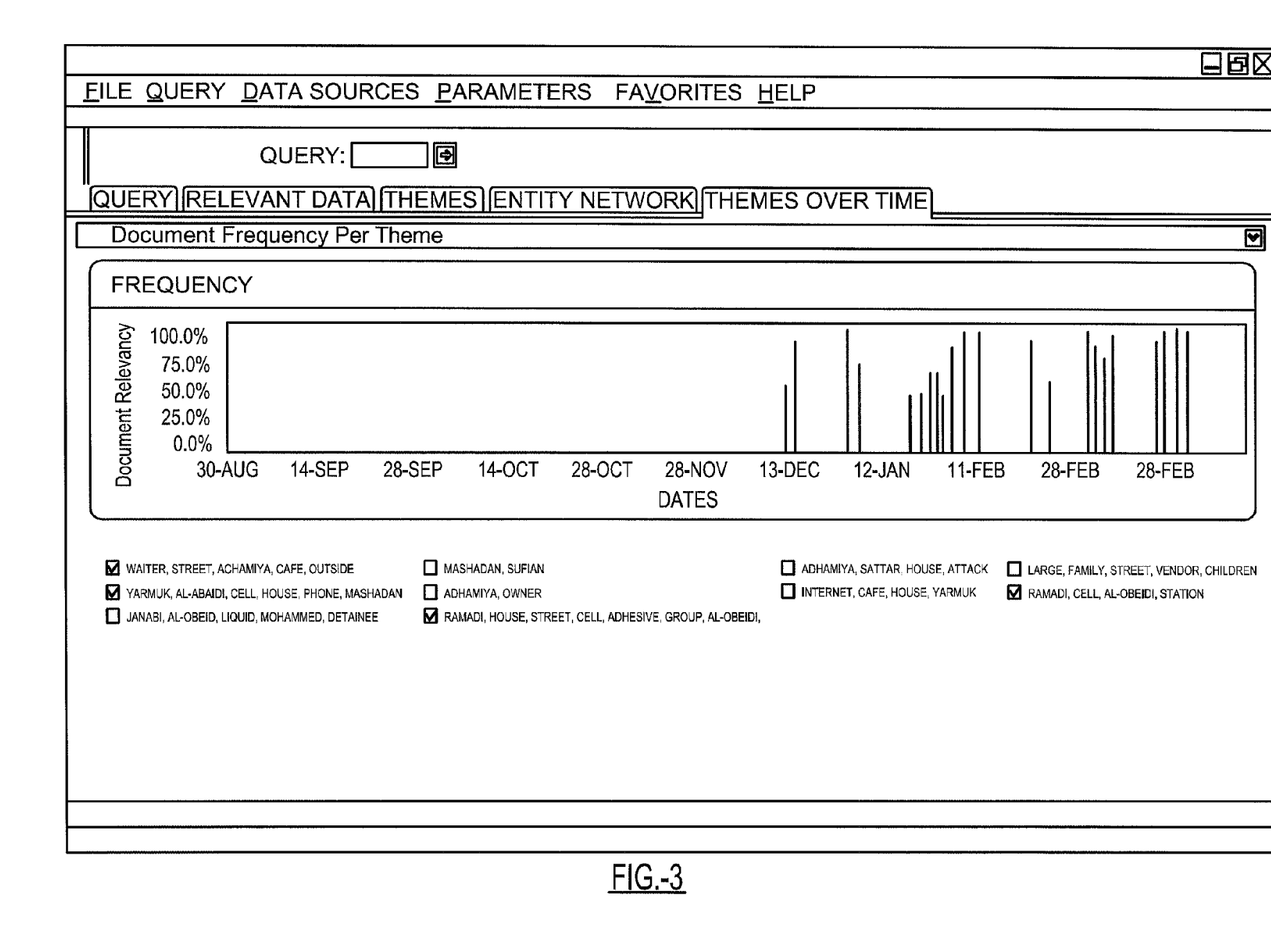
FIG. 3 shows a graph of activities over time.
Figure 4:
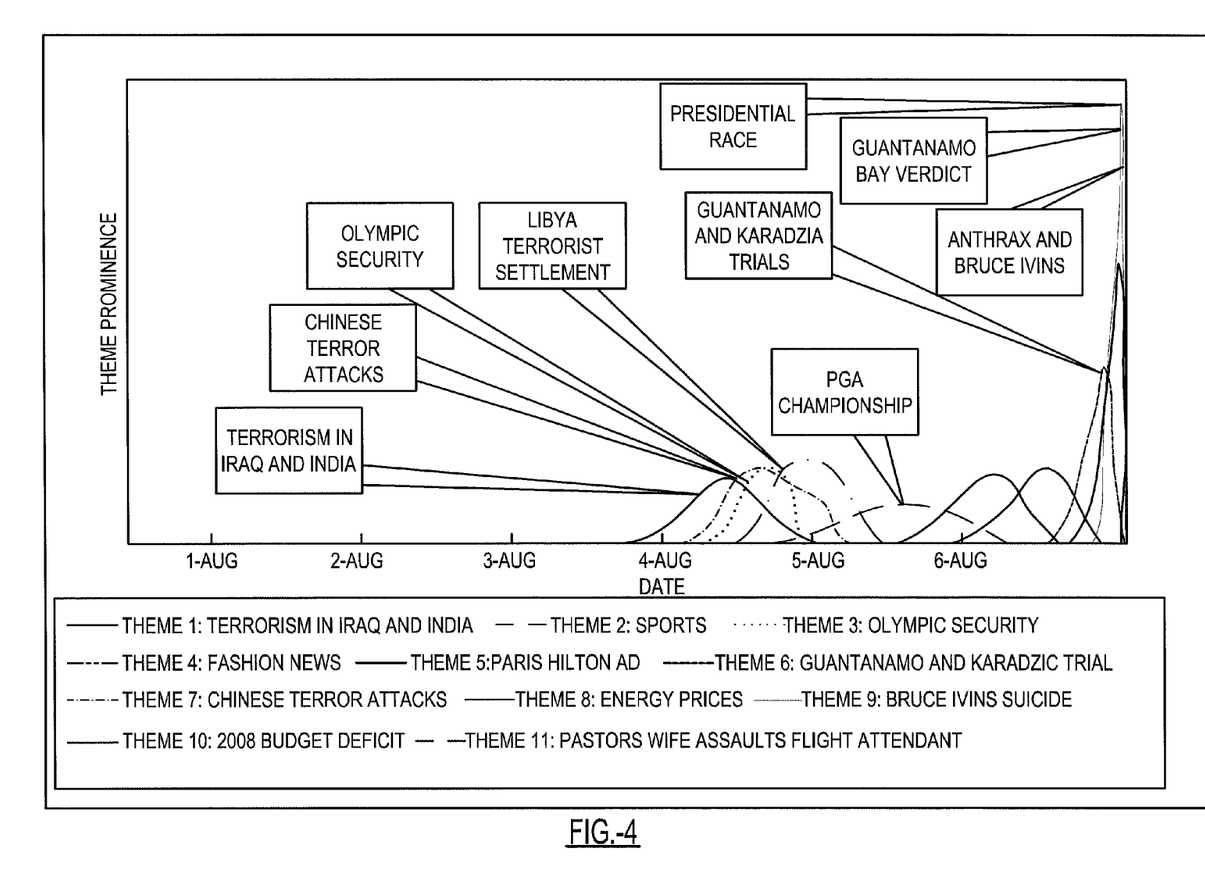
FIG. 4 shows a graph of trends and causality.

Referring now to the drawings wherein the showings are for purposes of illustrating embodiments of the invention only and not for purposes of limiting the same, FIGS. 1-8 show examples of the analytical system, which turns data into actionable intelligence that can be used to predict future events by identifying themes and networks, predicting events, and tracking them over time. The system processes any type of data set and is able to identify the number of themes in a data set and characterize those themes based on the content observed. The themes can be tracked over time as illustrated in FIG. 4, in which themes are shown that have emerged over time as of a particular day. For example, on August 4 we see discussions of terrorist activities in Iraq and India, a peak about a terror attack in China, followed by Olympic security concerns in Beijing. This illustrates the causality one can observe in trends using the system. We can see in midday August 6 there was discussion in the news about both the Guantanamo Bay Terror trial and the Karadzic trial. When a verdict was reached later that day in the terror trial, those news articles formed their own theme and spiked as news activity increased. The system is able to identify themes in data sets and provide meaningful labels. The analysts can then scan the themes and quickly determine what is important and what is not, leading to more focused analysis.

With reference now to FIGS. 1-8, in one embodiment, the system provides automated activity identification, automatic relationship identification, tracking of activities over time, identification of activities as they emerge, a text search engine, and accessing and analyzing source documents. Document co-occurrence is the current technique used to identify relationships across entities. Co-occurrence, however, will miss relationships between entities that are not mentioned in the same report and may imply relationships between individuals who are mentioned in the same report but may not have any meaningful relationship. The present system utilizes techniques that identify activities (aka themes).

Figure 5:
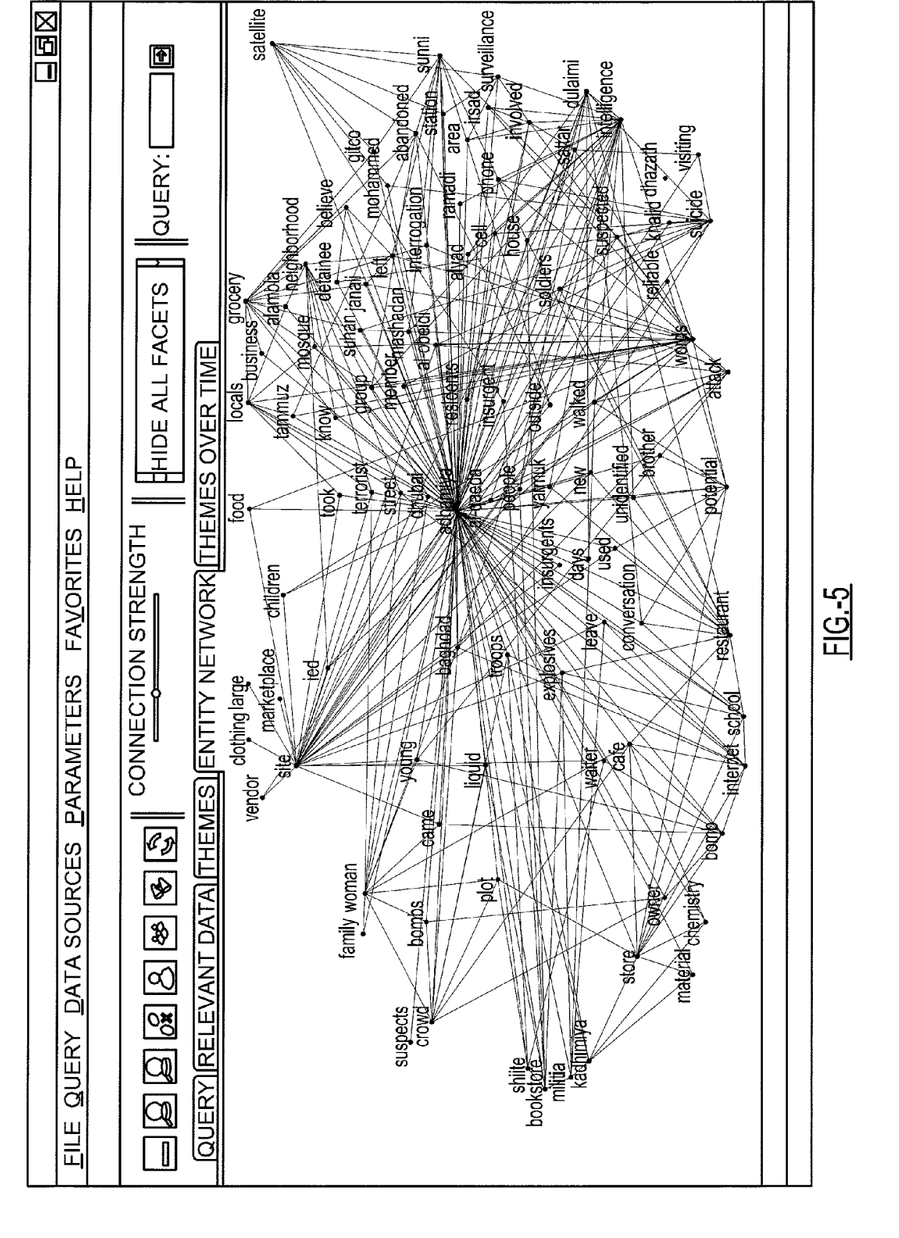
FIG. 5 shows a screen shot of multiple relationships between entities.
Figure 6:
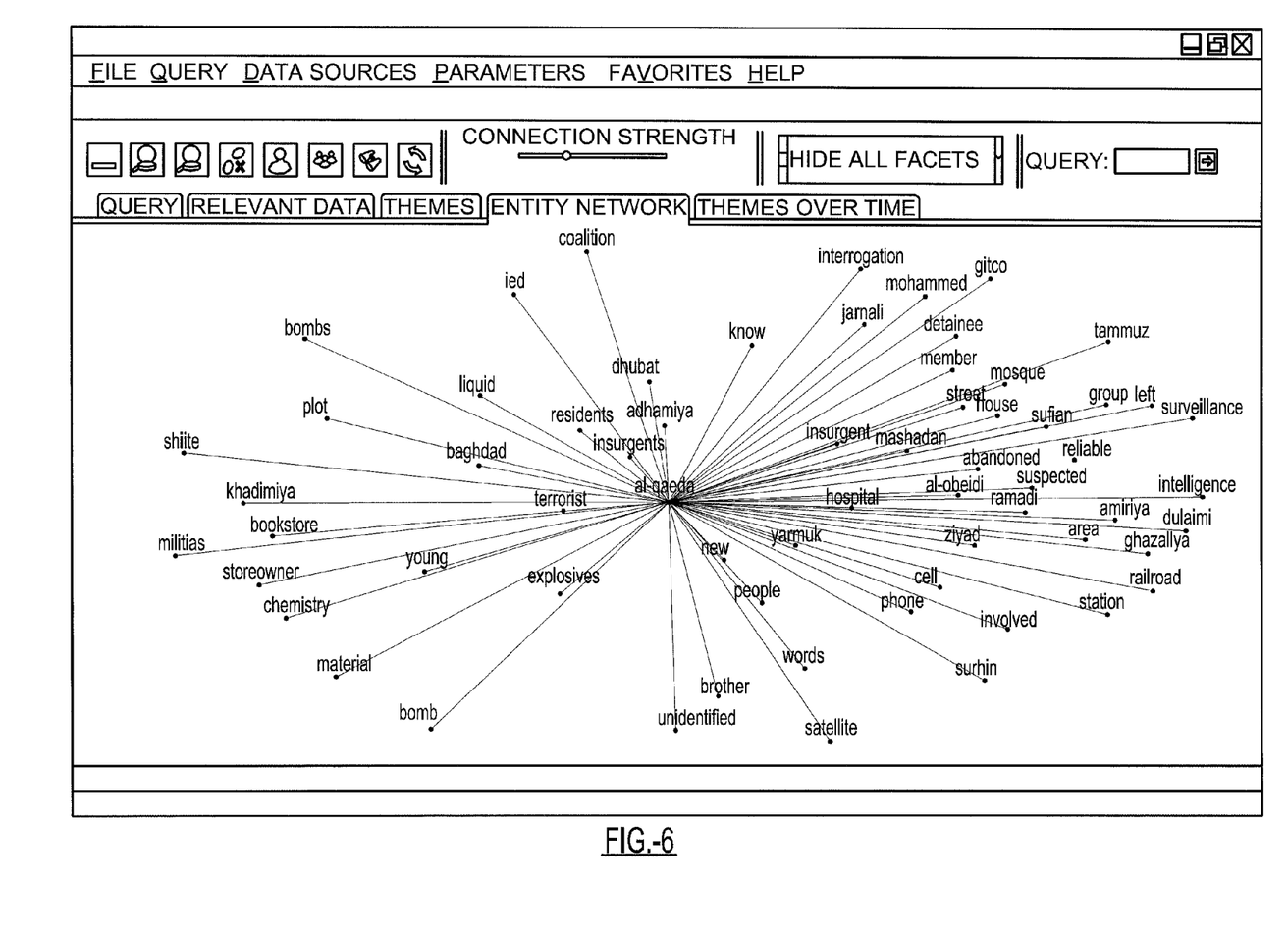
FIG. 6 shows a screen shot of relationships between entities.
Figure 7:
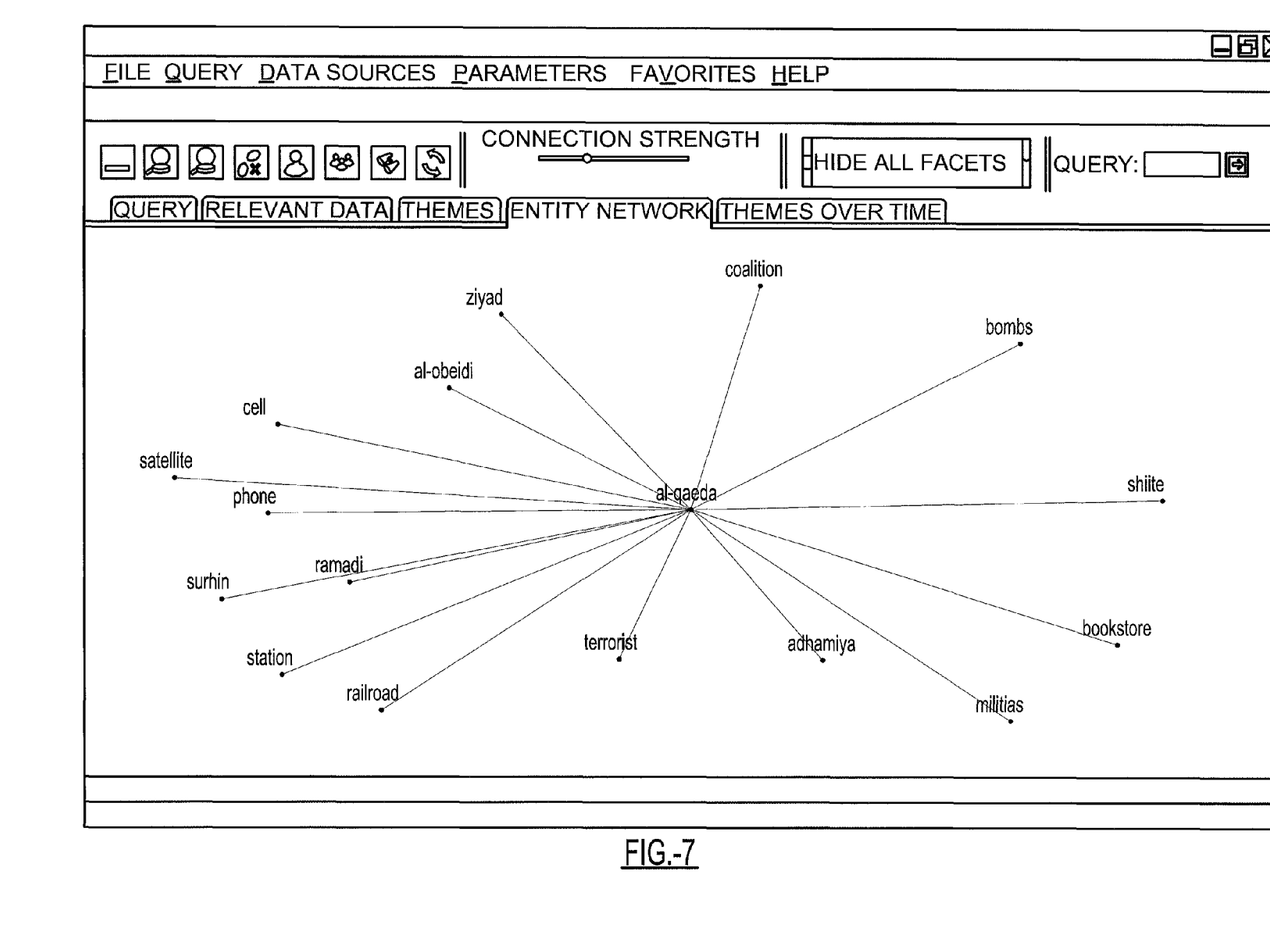
FIG. 7 shows the relationships between entities of FIG. 6 with the filter for strength of relationship increased; and, FIG. 8 shows a graph of a theme with subgroups.
Figure 8:
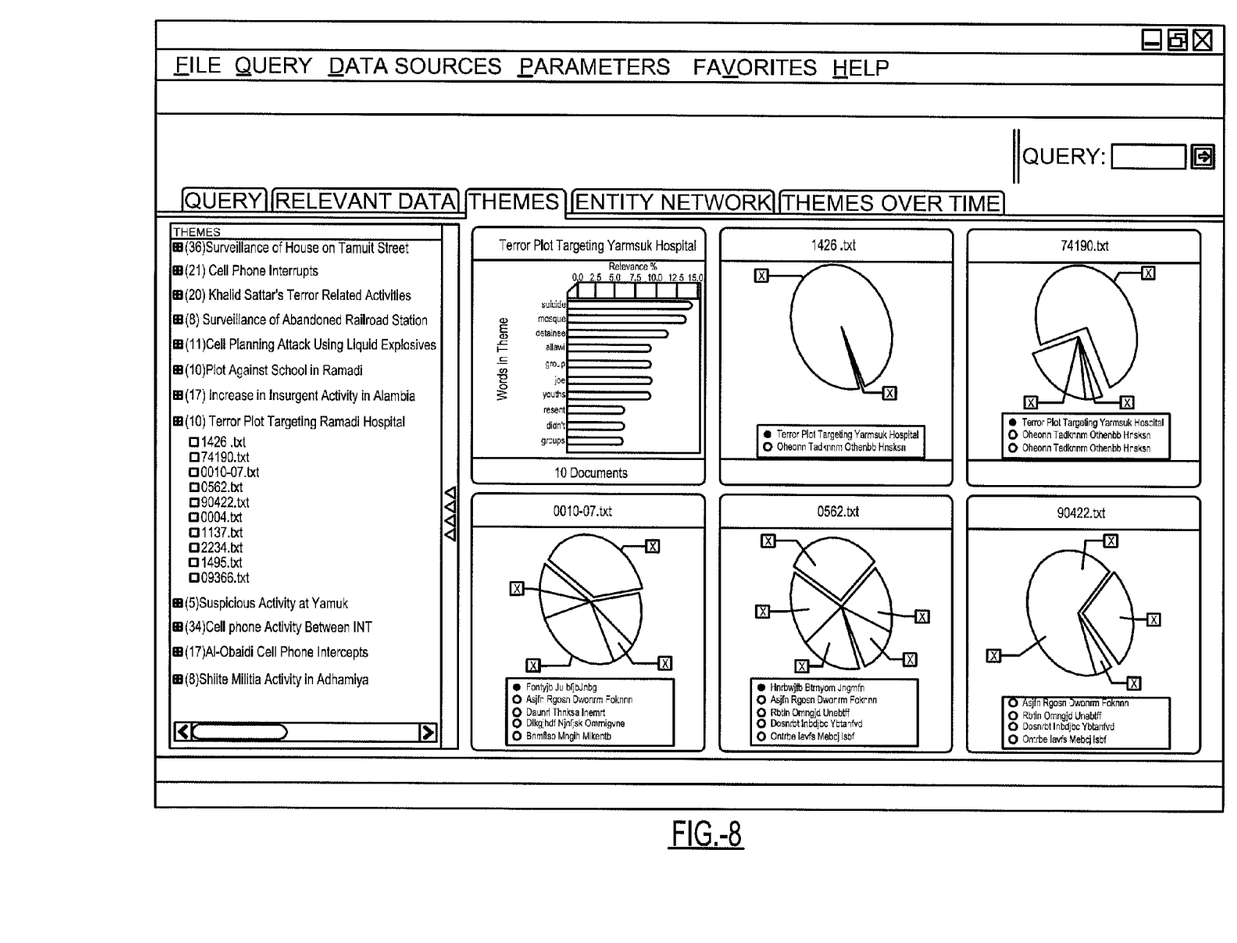

In one example, news sources were obtained by using the Really Simple Syndication (RSS) protocol from public news providers such as Yahoo® and CNN®. As can be seen in FIGS. 5 and 6 the connections and relationships do not become clear until filters are implemented on the strength of relationships. FIG. 5 shows the data where every relationship is shown, whereas FIG. 6 has been filtered to only showing more strongly connected relationships. One entity, Al-Qaida, is chosen from FIG. 6 and is selected on the screen; the entities related to Al-Qaida are shown in the same format as before (see FIG. 7). Upon review there is a link between Al-Qaida and Hezbollah, as can be seen in FIG. 7. After the various news sources are reviewed, it is found that Al-Qaida and Hezbollah are not mentioned in the same article (no co-occurrence). Upon review of the various themes, the association becomes apparent; the association is the common declaration against Israel. By making these associations through themes, the analyst can quickly focus on the entities that they are interested in, or be notified when new relationships are created. By organizing the data based on themes, and creating relationships based upon themes, the analyst can focus on the data that is most important and ignore data that is not relevant.

With continuing reference to FIGS. 1-8, from the themes the system can characterize the relationships that exist across the entities discovered in the data. Traditional approaches discover these relationships through document co-occurrence. However, the inventive system goes further by first identifying what entities may be collaborating on (through the themes) and then identifying who is collaborating. The system also characterizes the strength of relationships so the analyst can focus in on strong or hidden relationships.

The inventive system organizes the data into activities based on content by sifting through the data in a way that allows analysts to ask informed questions and come to detailed conclusions faster than before. The system identifies and characterizes relationships between entities. It automatically uses the activities that have been identified to visually characterize how entities in the data are associated with one another. The system also predicts future events by using historical and real-time data to provide an analyst with possible future events and their associated probabilities. The system processes structured and unstructured data.

With reference now to FIGS. 2 and 3, the system identifies when themes are emerging and declining, assisting the analyst in determining what is important at any given moment.

The system also recognizes people, places, and organizations, and groups them when they are related. From this analysis, the analyst can see how these entities are linked together.

The system begins with the various data sources, which can be news articles, news reports, cell phone calls, e-mails, telephone conversations, or any other type of information transmission. These data sources are entered into the system. A query based tool analyzes the data and organizes the data into themes. An algorithm using statistical analysis is used to determine the themes and their interconnectedness. Each data source can be associated with a theme, and in one embodiment the theme can be clicked on and all of the underlying data sources will be available under that theme for viewing by the analyst. A statistical probabilistic model can be used to determine the strength or weakness of the connection between themes or elements within themes. In one embodiment (as is seen in FIGS. 5-7) the closer a particular phrase is to the middle of the screen, the more related to the other themes it is. For example, in FIG. 7, "Al-Obeidi" is more closely related to "Adhamiya" than "leader" is. In this embodiment, a user can click on any word on the screen and all related terms will be given.

In one embodiment of the invention, the analysis of the data sources by the system is language independent. The system operates in whatever language the data source occurs in. The system, in this embodiment, does not really look at the language, but analyzes a string of characters. In one embodiment, the system has a correction mechanism for typographical errors, which allows terms to be designated as related in an appropriate manner.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A method for automatically organizing data into themes, the method comprising the steps of:
    retrieving electronic data from at least one data source;
    storing the data in a temporary storage medium;
    querying the data from the temporary storage medium using a computer-based query language;
    creating and identifying themes automatically within the data using a computer program including a statistical probability based algorithm;
    organizing the data into the identified themes based on the content of the data; and,
    identifying and predicting the probability of at least one future event.

2. The method of claim 1 wherein the data is unstructured text, video, and audio.

3. The method of claim 1 wherein the data is in several different languages.

4. The method of claim 1 further comprising the step of: correcting typographical errors in the data.

5. The method of claim 1 further comprising the step of: using a computer-program-based algorithm to identify themes that are at least one of emerging, increasing, or declining.

6. The method of claim 1 further comprising the step of: tracking themes over a time period.

7. The method of claim 1 further comprising the step of: characterizing the themes based on the level of threat the themes represent.

8. The method of claim 1 further comprising the step of: identifying a plurality of entities that are collaborating on the same theme.

9. The method of claim 8 further comprising the step of: determining the roles and relationships between the plurality of entities, including the affinity between the plurality of entities.

10. The method of claim 1 further comprising the step of: analyzing the queried data and posting the analysis on a computer database.

11. The method of claim 1 wherein the same data is organized into a plurality of themes.

12. The method of claim 1 further comprising the step of: determining the amount a discrete set of data that is organized into a report contributed to a specific theme.

13. A method for automatically organizing data into themes, the method comprising the steps of:
    retrieving electronic data from at least one data source;
    correcting typographical errors in the data;
    storing the data in a temporary storage medium;
    querying the data in the storage medium using a computer-based query language;
    creating and identifying themes automatically within the data stored in the storage medium using a computer program including a statistical probability based algorithm;
    characterizing the themes based on the level of threat each theme represents;
    organizing the data stored in the storage medium into the identified themes based on the content of the data;
    determining the amount a discrete set of data contributed to a specific theme;
    using a computer-program-based algorithm to identify themes that are at least one of emerging, increasing, or declining;
    tracking themes over a time period;
    identifying a plurality of entities that are collaborating on the same theme;
    determining the roles and relationships between the plurality of entities, including the affinity between the plurality of entities;
    identifying and predicting the probability of a future event; and,
    analyzing the queried data and posting the analysis on a computer database.

14. A computer-based system comprising:
    electronic data input from a plurality of data sources;
    a temporary storage medium for storing the electronic data;
    a computer-based query language tool for querying the data in the storage medium; and,
    a computer program including a statistical probability based algorithm for: (1) creating and identifying themes automatically within the data stored in the storage medium, (2) identifying a plurality of entities that are collaborating on the same theme, (3) determining the roles and relationships between the plurality of entities, and (4) identifying and predicting the probability of at least one future event.

15. The computer-based system of claim 14 wherein the data is unstructured text, video, and audio.

16. The computer-based system of claim 14 wherein the data is in several different languages.

17. The computer-based system of claim 14 wherein the system further comprises a computer database for storing analysis reports.

* * * * *

UNITED STATES PATENT AND TRADEMARK OFFICE
CERTIFICATE OF CORRECTION

| | | |
|---|---|---|
| PATENT NO. | : 8,458,105 B2 | Page 1 of 1 |
| APPLICATION NO. | : 12/548888 | |
| DATED | : June 4, 2013 | |
| INVENTOR(S) | : James J. Nolan, Mark E. Frymire and Andrew F. David | |

It is certified that error appears in the above-identified patent and that said Letters Patent is hereby corrected as shown below:

Specification

Col. 1, line 5, insert:

--This invention was made with Government support under Contract No. W911QX05C0009 awarded by the Department of Defense. The Government has certain rights in the invention--.

Signed and Sealed this
Twentieth Day of October, 2015

Michelle K. Lee
*Director of the United States Patent and Trademark Office*